United States Patent [19]
Wright et al.

[11] Patent Number: 5,141,823
[45] Date of Patent: Aug. 25, 1992

[54] ELECTRICAL GENERATING PLANT

[75] Inventors: Bartram J. Wright, Cartmel; Clive M. Seymour, Trinkeld, both of United Kingdom; Victor W. Adams, Bath; John P. Catchpole, Claygate, both of England

[73] Assignee: Vickers Shipbuilding and Engineering Limited, Cumbria, United Kingdom

[21] Appl. No.: 734,705

[22] Filed: Mar. 4, 1985

[30] Foreign Application Priority Data

Mar. 3, 1984 [GB] United Kingdom ............... 8405754
Feb. 12, 1985 [GB] United Kingdom ............... 8503592

[51] Int. Cl.⁵ .................................................. H01M 8/18
[52] U.S. Cl. ........................................... 429/19; 429/29; 429/63
[58] Field of Search ................ 429/15, 17, 19, 29, 429/63

[56] References Cited

U.S. PATENT DOCUMENTS

| | | | |
|---|---|---|---|
| 3,982,962 | 9/1976 | Bloomfield | 429/19 |
| 4,349,613 | 9/1982 | Winsel | 429/17 |
| 4,473,622 | 9/1984 | Chludzinski et al. | 429/19 |
| 4,532,192 | 7/1985 | Baker et al. | 429/19 |
| 4,585,708 | 4/1986 | Ahens et al. | 429/19 X |

FOREIGN PATENT DOCUMENTS

2292343 7/1976 France ........................... 429/19

Primary Examiner—Peter A. Nelson
Attorney, Agent, or Firm—Pollock, VandeSande & Priddy

[57] ABSTRACT

There is disclosed an electrical generating plant, especially for use in a submarine, having dual modes of operation and which comprises a fuel cell which requires a supply of gaseous hydrogen and a supply of gaseous oxygen in order to generate an electrical output. First supply means supplies to the plant a hydrogen-containing compound, preferably methanol, which is liquid at NTP and which can undergo an endothermic reaction to liberate gaseous hydrogen, and second supply means is provided which is selectively operable for supplying to the plant liquid hydrogen peroxide in a first mode of operation and air in a second mode of operation. A reformer is connected to the first supply means and causes the hydrogen-containing compound to undergo the endothermic reaction with liberation of gaseous hydrogen, whereas a decomposer is selectively connectible to the second supply means, in the first mode of operation, and is arranged to decompose the hydrogen peroxide exothermically so as to liberate gaseous oxygen. Means is provided, preferably by means of the decomposer in the first mode of operation, for transmitting heat to the hydrogen-containing compound, prior to and/or during its reception by the reformer, so as to maintain the endothermic reaction in the reformer. However, for the second mode of operation, separate means is provided for supplying heat to the reformer, in order to maintain the endothermic reaction. The gaseous hydrogen given-off in the reformer is supplied to the fuel cell, in the first and second modes of operation. Concerning the supply of gaseous oxygen to the fuel cell, this is derived from the decomposer in the first mode of operation, whereas it is obtained from an air source in the second mode of operation, whereby an electrical output is obtainable from the fuel cell in the first or the second modes of operation. When the electrical generating plant is applied to a submarine, the plant can operate in the first mode of operation underwater, and in the second mode of operation during surface or snorting operation of the submarine.

17 Claims, 5 Drawing Sheets

ELECTRICAL GENERATING PLANT

This invention relates to an electrical generating plant which comprises a fuel cell which requires a supply of gaseous hydrogen and a supply of gaseous oxygen to produce an electrical output.

The present invention has been developed primarily, though not exclusively, with a view to provide an electrical generating plant which is particularly suitable for use in a submarine. For the purposes of the present specification, there will be described the application of an electrical generating plant according to the invention for use in a submarine, though it should be understood that the invention has general application for use in other environments in which supplies of air/oxygen may be limited or not available, including use in space vehicles, such as orbital craft and artificial satellites, or for emergency use in hazardous environments, such as rescues in mines.

It is common practice for ocean-going submarines, which are not powered by a nuclear reactor, to use a diesel engine for propulsion when on the surface or snorting, and batteries when fully submerged. The main problem with diesel/electric submarines is that battery capacity severely limits the fully submerged endurance of the vessel, and there is therefore a requirement for a power supply which is capable of extending the submerged operational capability for a submarine within the physical and operational restraints imposed by a submarine. Such restraints include limits on the space and weight of the power conversion plant, volumetric requirements of fuel(s) and buoyancy problems created by the increasing ullage as the fuel(s) is consumed.

One possible power system, known as a Re-Cycle Diesel System uses a conventional diesel engine aspirating oxygen diluted with steam and/or exhaust gas in a self-contained closed cycle. While such a system extends the endurance of a submarine based upon batteries alone, it suffers from the disadvantages of total weight, volume of fuel and oxidant required, disposal of combustion products and noise.

Though other variations of diesel-engined energy conversion systems are known, none offer significant advantages for this application. The efficiency of energy conversion of a diesel/generator is 20-30%. However, fuel cells, which directly convert chemical to electrical energy, have a proven energy conversion efficiency of 50-60%. Thus, if a reliable fuel cell capable of producing the required power output could be combined with a satisfactory means of storage for the reactants, a suitable power producing system for a submerged submarine could be provided.

Various types of fuel cell have been the subject of considerable development effort and now offer high specific performance with demonstrated reliability. A first type of cell combines high purity gaseous oxygen and hydrogen to form water with the production of substantial quantities of electrical power. Such a fuel cell can be started up easily, power output may be varied automatically and the operation of the cell is virtually silent. The problem is the provision of high purity gaseous oxygen and hydrogen. Oxygen and hydrogen are both permanent gases and thus cannot be liquefied at normal temperatures by the application of pressure. The gases may thus be stored either under high pressure in cylinders, which invokes a penalty for the weight of the containers and the volume of gases that could be stored, or as cryogenic liquids, which may generate space problems, buoyancy problems due to changing ullage and problems associated with shock loading. Hydrogen may also be stored in solid form in chemical combination as a metal hydride, but this also poses weight problems.

A second type of fuel cell can utilize oxygen from air and the use of such a cell is equally advantageous. This type of cell could be used when a submarine was on the surface or snorting using normal air. When the vessel is submerged, this type of cell could be operated using the air inside the submarine, provided that the oxygen content in this air is maintained.

SUMMARY OF THE INVENTION

According to the invention there is provided an electrical generating plant having dual modes of operation and comprising:

a fuel cell which requires a supply of gaseous hydrogen and a supply of gaseous oxygen in order to generate an electrical output;

first supply means for supplying to the plant a hydrogen-containing compound which is liquid at NTP and which can undergo an endothermic reaction to liberate gaseous hydrogen;

second supply means selectively operable for supplying, to the plant, liquid hydrogen peroxide in a first mode of operation and air in a second mode of operation;

a reformer, connected to the first supply means, in which said compound can undergo said endothermic reaction and liberate gaseous hydrogen;

a decomposer which is selectively connectable to said second supply means, in the first mode of operation, and which is arranged to decompose the hydrogen peroxide exothermically so as to liberate gaseous oxygen;

means for transmitting to the hydrogen-containing compound all or part of the heat which is given-off in the decomposer in the first mode of operation, so as to maintain the endothermic reaction in the reformer;

means for supplying heat to the hydrogen-containing compound, in the second mode of operation, so as to maintain the endothermic reaction in the reformer;

means for supplying the gaseous hydrogen given-off in the reformer to the fuel cell; and means for supplying to the fuel cell the gaseous oxygen which is given-off in the decomposer in the first mode of operation, and means for supplying the air to the fuel cell in the second mode of operation, whereby an electrical output is obtainable from the fuel cell in the first or the second modes of operation.

The hydrogen peroxide is decomposed exothermically in the decomposer, and preferably means is provided for supplying heat from the decomposer to the reformer, so as to maintain the endothermic reaction in the reformer.

It should be particularly noted that the heat available from the decomposition of hydrogen peroxide in the decomposer is of a high quality i.e. concentrated high temperature heat, which is especially suitable for use in promoting and maintaining the reforming reaction of the hydrogen-containing compound in the reformer.

This provides for efficient operation of the electrical generating plant in the first mode of operation, in that what would otherwise be waste heat given-off in the decomposer, is used as a heat source for maintaining the endothermic reaction in the reformer.

When an electrical generating plant according to the invention is installed in a submarine, it may be used to supply the entire motive power for the submarine, both underwater, and also in surface/snorting operation. In underwater operation, hydrogen peroxide may be supplied to the decomposer (in the first mode of operation) and the heat given-off in the decomposer is supplied to the hydrogen-containing compound in order to maintain the endothermic reaction. Alternatively, the heating requirements for the reforming reaction may be met wholly or in part by other sources of waste heat, or by part of the electrical output from the fuel cell.

However, in the surface/snorting operation of the submarine, it is no longer necessary to use hydrogen peroxide as a source of oxygen for the fuel cell, which can be derived from the atmosphere. This then enables the supply of hydrogen peroxide to be conserved. However, the lack of availability of heat from the exothermic reaction of hydrogen peroxide in the decomposer (to maintain the endothermic reaction in the reformer) has to be met from other sources. This may be derived, for example, from burning a portion of the hydrogen-containing compound, which is preferably methanol, or any suitable chemical with an adequate heat of combustion e.g. fuel oil.

Alternatively, a portion of the electrical power output produced by the fuel cell may be used to provide the heating requirements of the reformer. In addition, or alternatively, other sources of waste heat, occurring elsewhere-in the plant, may, where practicable, be used in preference to burning the source of hydrogen and/or the use of electrical power. It is further possible that all three sources of heat may be used, i.e. waste process heat, chemical and electrical energy could be used either singly, in any combination of two, or all three together to provide the process heat requirements in the most practical and/or economic way.

The preferred hydrogen-containing compound to be used in the electrical generating plant is methanol, though other alcohols, or hydrocarbons may be used, provided that they are liquid at NTP and can undergo an endothermic reforming reaction to liberate gaseous hydrogen.

When, as is preferred, methanol is used as the hydrogen-containing compound, this is particularly suitable having a specific gravity of about 0.8 at NTP and a boiling point of 64.7° C. The reforming reaction requires the addition of pure water to the methanol, and advantageously this is derived from the pure water produced during the operation of the fuel cell.

The hydrogen peroxide, which is used as a source of oxygen, may be catalytically decomposed into oxygen and water. Hydrogen peroxide is a highly reactive compound and is usually supplied in aqueous solution. Certain concentrations of hydrogen peroxide may be used, but 85% is preferred. Such a concentration would have a specific gravity of about 1.36 and be a liquid at NTP.

The exothermic decomposition of the hydrogen peroxide reaction may be used to provide some or all of the necessary heat input for the endothermic methanol reforming reaction in the first mode of operation, thereby, as indicated above, maximizing the thermal economy of the operation of the generating plant and reducing/eliminating the requirement to use an alternative source of heat, such as electricity derived from the fuel cell.

Advantageously, the exothermic decomposition and the endothermic reforming reactions are carried out in close proximity in order to maximize heat transfer. In a possible arrangement, both reactions could take place in a single vessel, separated only by a highly thermally conductive member, though other high efficiency means of heat transfer may be employed as desired.

It is also preferable to arrange that the hot product streams leaving the reformer/decomposition vessel(s), plus other sources of heat e.g. the fuel cell, catalytic oxidizers and the like should be used to preheat the reactants i.e. methanol and water, prior to reaching the reforming reaction stage.

The invention therefore provides an electrical generating plant which utilizes a fuel cell, which is capable of high power output and high efficiency of energy conversion, and yet without requiring cryogenic or high pressure storage of hydrogen and oxygen sources. By providing, as is preferred, for the thermal requirements of the reforming reaction to be met in the first mode of operation, at least substantially, by the heat produced by the decomposition reaction, together with other thermal economies, virtually the entire output of the fuel cell is available for use, in that the plant operates in substantially thermally self-sufficient manner in the first mode of operation.

DESCRIPTION OF PREFERRED EMBODIMENT

The fuel cells which are employed in an electrical generating plant according to the invention are of the type which require the provision of pure supplies of gaseous hydrogen and oxygen, or gaseous hydrogen and air (as a source of gaseous oxygen), in order to generate an electrical output.

Fuel cells of the above type which may be used include the following:
Solid Polymer Electrolyte
Air/Hydrogen or Oxygen/Hydrogen
Low temperature 6°-105° C.
Phosphoric Acid Electrolyte
Air/Hydrogen or Oxygen/Hydrogen
Operating temperature 150°-190° C.
Alkaline (Potassium Hydroxide) Electrolyte
Oxygen/Hydrogen (can use air if Carbon Dioxide is first scrubbed out)
Low temperature 60°-90° C.

The chemical reactions will now be described which take place, in order to generate supplies of gaseous hydrogen and oxygen to the fuel cell, and to convert the chemical energy in the fuel cell into electrical energy.

A gaseous supply of pure oxygen is derived from hydrogen peroxide which decomposes according to the equation:

$$2H_2O_2 \rightarrow 2H_2O + O_2 + \text{heat} \quad (1)$$

Hydrogen peroxide is an unstable chemical and requires only a small means of activation to initiate decomposition. Thus, for safety reasons, it is usually available as an aqueous solution. It is found that an 85% solution of hydrogen peroxide provides the required levels of decomposition heat while reducing the handling and storage risks to acceptable levels. A catalyst is used to ensure that the decomposition reaction (1) occurs in a reaction vessel 12 (described below with reference to FIG. 1) and is as nearly complete as possible.

A gaseous supply of pure hydrogen is derived from a reforming reaction of any suitable alcohol or hydrocarbon, provided that such supply is liquid at NTP and can undergo an endothermic reforming reaction to liberate gaseous hydrogen. The preferred hydrogen-containing compound is a reformable alcohol, and especially methanol in vapor form which is reformed with steam in the presence of a catalyst according to the overall reaction equation:

$$CH_3OH + H_2O + \text{heat} \rightarrow CO_2 + 3H_2 \quad (2)$$

The methanol reaction is, in fact, a two part reaction, which comprises decomposition according to the equation:

$$CH_3OH \rightarrow CO + 2H_2 \quad (2A)$$

followed by a shift reaction according to the equation:

$$CO + H_2O \rightarrow CO_2 + H_2 \quad (3)$$

The overall reaction is strongly endothermic and thus requires considerable heat to achieve an acceptable rate of hydrogen production. To facilitate the heat exchange between the decomposition and reforming reactions, it is advantageous for the two reactions to occur in very close proximity, preferably in the same vessel, and separated only by a heat transfer member, as described in more detail below. A concentric vessel with one reaction occurring in the bore and the other in the annulus and a highly conductive annular member separating the two is ideal. Another suitable form of vessel for this purpose could be similar to a tube and shell heat exchanger with, for example, the decomposition reaction occurring outside the tubes and the reforming reaction inside the tubes. The particular design of the vessel would also depend on the types of catalysts to be used and whether the passage of the two flow currents is to be co-current or counter-current. Alternatively, the reactions could be performed in separate vessels with a highly efficient means of heat transfer between the two vessels, for example heat pipes and the like, or by means of electrical heating.

Once hydrogen gas has been produced, it must be purified before it can be passed to the fuel cell. The means of purification will be described hereinafter, but the reason for this requirement is that the active elements in a fuel cell can easily be "poisoned" by the presence of impurities, thus reducing the operational efficiency of the cell. Hydrogen and oxygen react in a fuel cell to produce pure water, heat and electrical energy according to the equation:

$$2H_2 + O_2 \rightarrow 2H_2O + \text{heat} + \text{electrical energy} \quad (4)$$

The pure water produced may be used as diluent for the methanol prior to reforming, and any excess water may be used for domestic purposes by the crew of a submarine, when the electrical generating plant is provided therein.

Figure 4:
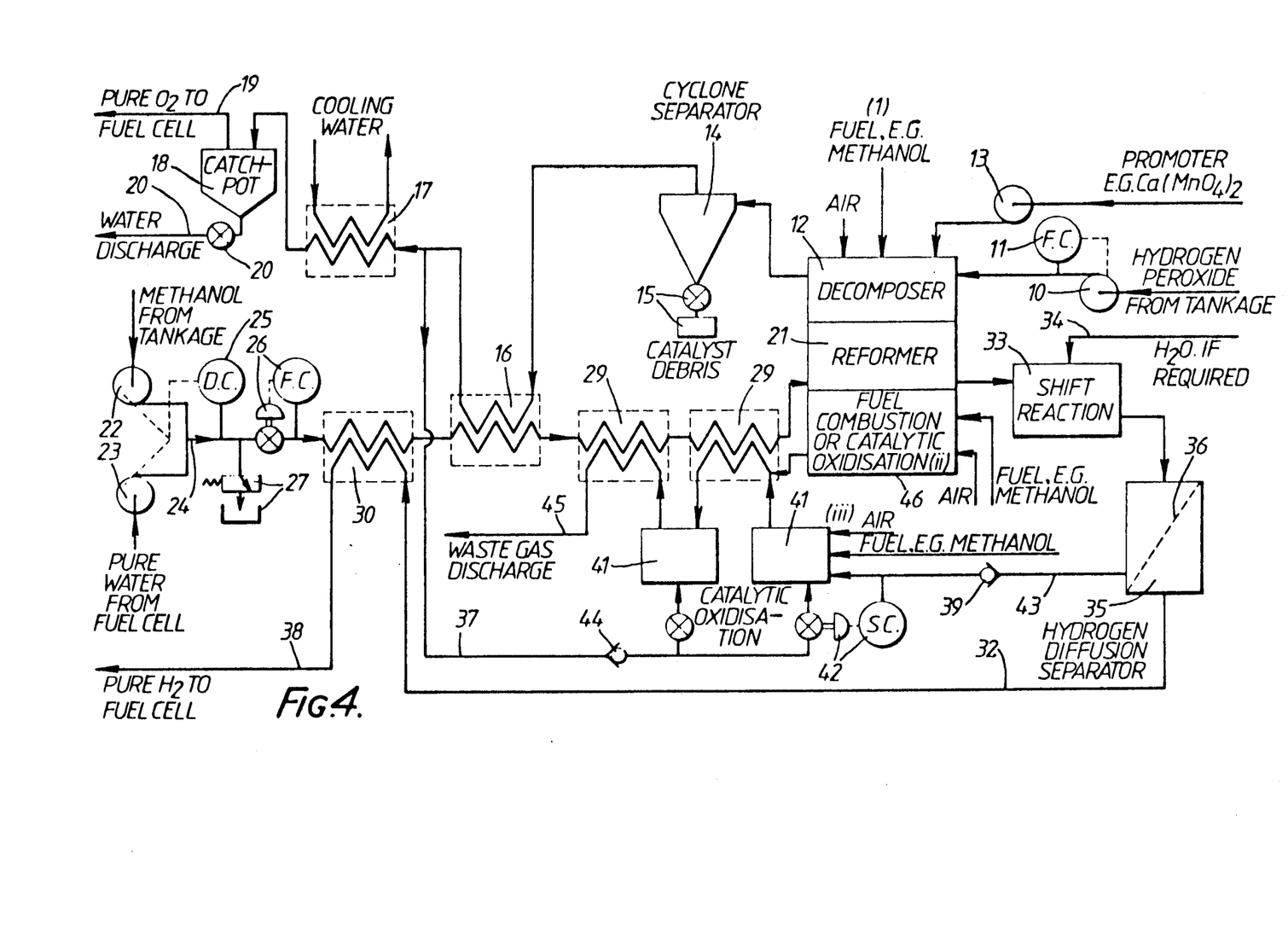
FIG. 4 is an illustration, similar to FIG. 1, of an embodiment of electrical generating plant according to the invention.

One embodiment of electrical generating plant according to the invention, for use in a submarine, is shown in FIG. 4. However, description will first be made of the plant shown in FIGS. 1 and 2, in which methanol and liquid hydrogen peroxide are used as the starting materials for generating gaseous hydrogen and oxygen respectively for supply to a fuel cell which forms part of the plant.

Figure 1:
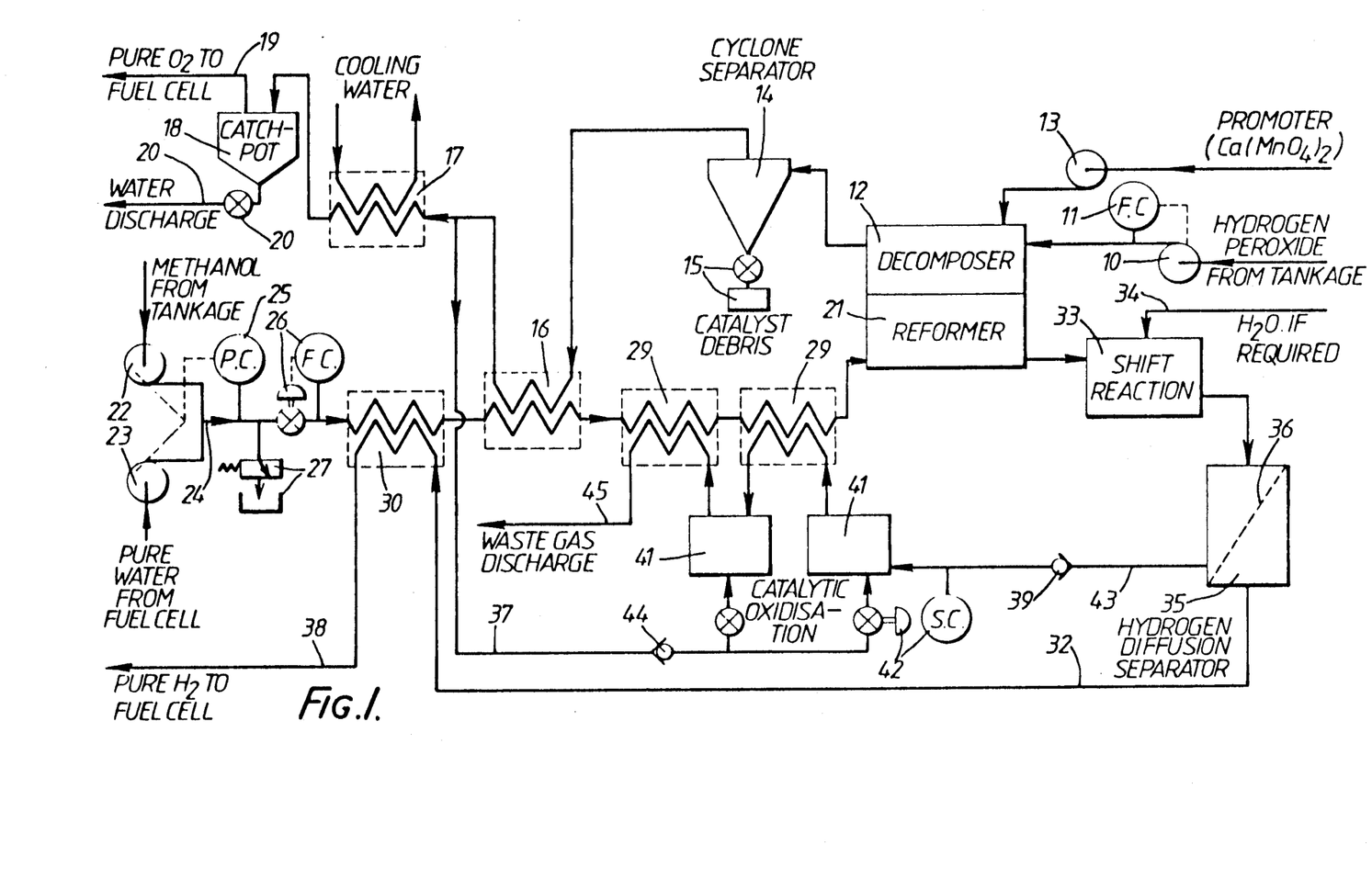
FIG. 1 is a diagrammatic illustration of an electrical generating plant for use in a submarine, including apparatus for producing oxygen and hydrogen gases for supply to a fuel cell.

Referring now to FIG. 1, hydrogen peroxide is drawn from tankage by a pump 10 and passed into a decomposer 12. A promoter, such as calcium permanganate may also be added by pump 13 to start the hydrogen peroxide decomposition when the decomposer 12 is cold. The tankage (not shown) for the hydrogen peroxide as well as for the methanol preferably comprises flexible bags located outside the pressure hull, but within the hydrodynamic casing of the submarine. There are several advantages for such a method of storage, e.g. space saving within the pressure hull, depth pressure effectively 'pumps' the liquid into the submarine and there is no ullage because the bag just collapses as liquid is withdrawn thus substantially reducing buoyancy problems.

In the decomposer 12, the hydrogen peroxide contacts a first catalyst which ensures that the majority of the hydrogen peroxide decomposes. As this is a very violent reaction producing considerable heat, the conditions placed on the catalyst are very arduous so that the product gases are then passed via a cyclone 14, to separate any catalyst debris from the gas stream and collected via the valve in a container 15. From cyclone 14, the gases pass through a heat exchanger 16 where they are cooled by transferring heat to a methanol/water inflow to the apparatus. After further cooling in a heat exchanger 17, the decomposed hydrogen peroxide, which now consists of mostly liquid water, oxygen and possibly some residual hydrogen peroxide, passes to a catchpot 18, (which may be catalyzed if necessary), where liquid water is connected. Pure saturated oxygen passes out via pipe 19 while waste water leaves via valve and pipe 20. The operation of valve 20 is by level controller. In practice the decomposition of hydrogen peroxide in decomposer 12 may be so complete that further catalyst in catchpot 18 is not necessary; however if the conversion efficiency is not as high as expected, e.g. when starting up, additional catalyst is required.

Methanol from tankage (not shown) and pure water are passed by pumps 22 and 23 respectively to a mixing pipe 24 where mixing occurs. A proportional controller 25 measures the proportions of the mixture and controls the operation of one/both pumps 22 and 23 to achieve the desired methanol/water ratio, A flow controller (F.C.) and valve 26 regulates the flow of methanol/water mixture via heat exchangers 30, 16 and 29, to a reformer 21 where reaction 2 (i.e. 2A) occurs. The decomposer 12 and the reformer 21 are shown side-by-side to emphasize the thermal interdependence of the two reactions. The reactions may be conducted in the same vessel separated by a highly conductive membrane or in adjacent vessels with enhanced thermal transfer, e.g. via heat pipes, and the like to provide means for transmitting heat given-off in the decomposer 12 to the reformer 21 in order to maintain the endothermic reaction therein. The flow controller/valve 26 in the methanol/water line is linked via a central controller (not shown) to flow monitor/controller 11 in the hydrogen peroxide line so that, under normal operational conditions, the flows can be balanced to equate the thermal requirements of the reforming and decomposition reactions and/or the rates of oxygen and hydrogen production. The pressure relief and tankage 27 is provided from pipe 24 as a safety precaution.

The pure water, passed by pump 23, is produced by the fuel cell (FIG. 2) and is held in an intermediate storage tank (not shown) until required.

For safety reasons, it may be desirable to separate the decomposer 12 and the reformer 21 from close proximity to each other. However, heat given-off in the decomposer 12 is still used usefully, in that the incoming flow of methanol/water to the reformer 21 is pre-heated in the heat exchanger 16. When the decomposer 12 and the reformer 21 are separated, additional heating may be required in the reformer 21 so as to cause the reaction to go to a reasonable degree of completion. This may be provided by any suitable means, such as electrical heating. It is envisaged that substantial pre-heating of the methanol/water inflow may take place via the heat exchangers 30, 16 and 29, say up to 80% of requirements, with the remainder of the required heating (to maintain the endothermic reaction) taking place in the reformer 21.

It will be noted that the methanol/water flow is heated by passing through three heat exchangers 30, 16 and 29. The order in which these heat exchangers come along the methanol/water pipe run will depend on the particular temperature of hot and cold fluids at each point; the number and order of heat exchangers 30, 16 and will be determined to obtain maximum thermal economy. Electric heating (not shown) may also be provided, if required, e.g. for start up or in the reformer 21. Heat exchangers 30, 16 and 29 may operate under co-current or counter-current flow, as determined by thermal efficiency requirements. Similarly the flow of the hydrogen peroxide and methanol/water streams through the decomposer 12 and the reformer 21 may be either co-current or counter-current.

Chemical reactions seldom go to completion, i.e. 100% conversion of the reactants, and often side reactions occur. This is the case with the methanol/water reforming. If the shift reaction (Equation 3) has not occurred sufficiently in reformer/decomposer 12, an additional opportunity for the reaction to take place must be provided. In FIG. 1, the products of the reforming reaction, consisting of hydrogen, carbon dioxide, carbon monoxide, unreformed methanol and steam leave the reformer 21, and pass to a shift reaction vessel 33. Additional pure steam along supply line 34 may be added, if required, and the shift reaction proceeds, in the presence of a catalyst if needed, according to Equation 3, changing most of the unconverted carbon monoxide to carbon dioxide with the production of further hydrogen.

The gases now pass into a separation vessel 35 where the hydrogen gas is separated from the other gases. Because it has the smallest atomic volume of all elements, hydrogen gas will diffuse through the crystal structures of some substances, whereas other gases cannot. The metal palladium is unique in having a crystal lattice just large enough to permit the passage of hydrogen, yet not large enough for any other gas to pass. Thus a diffusion membrane 36 of palladium, or its alloys, separates the two parts of diffusion separation vessel 35, allowing only hydrogen to pass through membrane 36 under a pressure differential. From diffusion separation vessel 35, via pipe 32, the pure hydrogen gas is cooled in cooler 30 and passed via pipe 38 to the fuel cell (not shown).

The other gases which leave the diffusion separation vessel 35 pass along pipe 43 and consist mainly of carbon dioxide with smaller amounts of carbon monoxide, hydrogen, steam and methanol vapor. These are all waste gases. It will be noted that not all the hydrogen gas is removed in the diffusion separation vessel 35; this is because diffusion is a physical process and the time-scale required to achieve dynamic equilibrium would be unacceptable for the rate of hydrogen production required. Of the gases in pipe 43, carbon monoxide and hydrogen are sparingly soluble in water and therefore cannot be discharged from a submarine without fear of bubbles rising to the surface and noise generation due to bubble collapse thus betraying the position of the vessel. As onboard storage of gas under pressure has been rejected previously, it is necessary to chemically convert these gases to soluble forms. This can be done by catalytic oxidaton to carbon dioxide and water, with the oxygen for this requirement coming from decomposed hydrogen peroxide via pipe 37, and according to the following equations:

$$2H_2 + O_2 \rightarrow 2H_2O + \text{heat} \qquad (5)$$

$$2CO + O_2 \rightarrow 2CO_2 + \text{heat} \qquad (6)$$

$$2CH_3OH + 3O_2 \rightarrow 2CO_2 + 4H_2O + \text{heat} \qquad (7)$$

The gases from the separator 35 pass via a non-return valve 39 and along pipe 43 to a first catalytic oxidizer 41. A stoichiometric control system 42 regulates the process. It consists of a meter (SC) upstream of the catalytic oxidizer 41 to measure the concentrations of hydrogen and carbon monoxide in the gas, and a control valve 42 to admit oxygen from a pipe 37 via a non-return valve 44. Depending on the efficiency of the reforming and shift reactions, more than one catalytic oxidizer 41 may be required; two are shown in FIG. 1.

The heat generated in the catalytic oxidization is transferred via heat exchanger(s) 29 to the methanol/water stream entering the reformer 21. After passing through heat exchanger(s) 29, the gases are dissolved and discharged overboard via pipe 45.

It will be noted that as the methanol is stored externally to the pressure hull, it will thus be at diving depth pressure. Pump 22 will raise this pressure by a small amount to give the operating pressure in the system shown in FIG. 1. Throughout the system, the pressure will be virtually maintained so that the gas may be dissolved and discharged from pipe 45 directly overboard (probably through a non-return valve (not shown)), without the need for pumping. The same situation applies to pump 10 in the hydrogen peroxide line. Pumps 23 and 13 will have to raise water and calcium permanganate respectively from ambient pressure up to system pressure, but in both cases only small volumes need be handled. Thus, from a pumping aspect, only a minimum energy need be expended to operate the system. Like the thermal economy of the system, the pumping requirements are also designed to maximize the output of useful energy from the plant.

Figure 2:
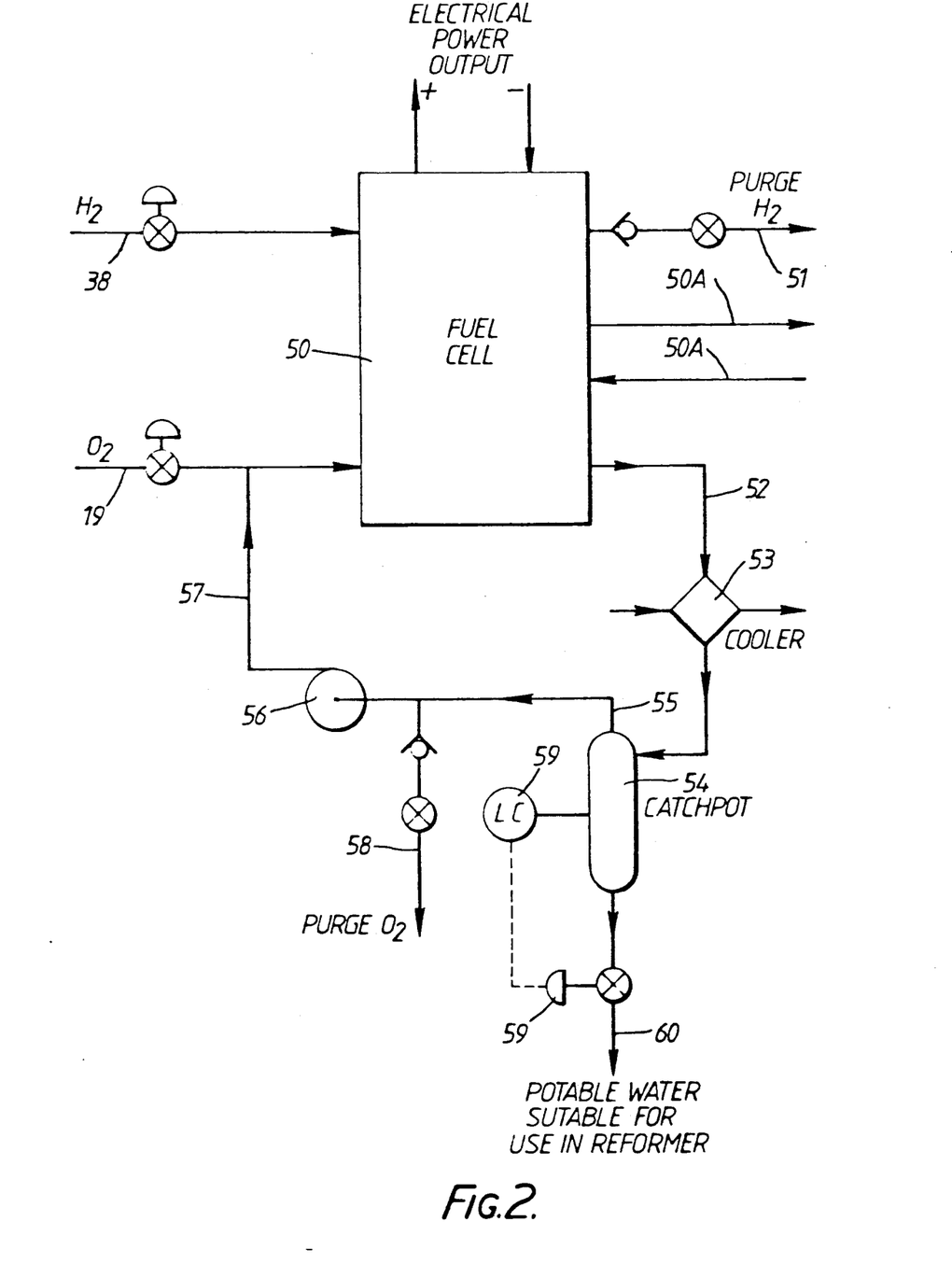
FIG. 2 is a diagrammatic illustration of the combination of oxygen and hydrogen in the fuel cell to produce electrical power.

Referring to FIG. 2, pure oxygen and hydrogen gases enter a fuel cell 50 via pipes 19 and 38 respectively. Although "fuel cell 50" is referred to in the singular, it will be understood that a plurality of fuel cells will be used in real installations; the cells may be arranged in series or parallel or any required combination. Reaction 4 occurs producing electrical energy (shown at the top of the figure), water and heat. The rate of reaction is controlled by the valve in pipe 38 admitting hydrogen to the fuel cell 50. Though diffusion membrane 36 of separator 35 (FIG. 1) should pass only hydrogen gas, flaws in the metal may lead to small amounts of other gases also passing. As these impurities would tend to build up in fuel cell 50 due to not reacting, a purge 51 of hydrogen is provided for use on a continuous or intermittent basis, as required.

Steam and unused oxygen leave the fuel cell via outlet pipe 52 and the steam condenses in a cooler 53. Pure water is separated in a catchpot 54 and passed via a level controller/valve 59 and a pipe 60 to storage (not shown) where it is used for methanol dilution, (via pump 23, FIG. 1) in supply line 34 to vessel 33 (FIG. 1) or as potable water. The unused oxygen leaves catchpot 54, via pipe 55, and is circulated by pump 56 and pipe 57 back to the fuel cell. As members 52, 53, 54, 55, 56 and 57 form a closed loop, a purge 58 is provided to prohibit the build-up of impurities. The oxygen circulation around loop 52, 53, 54, 55, 56 and 57 also provides some cooling for fuel cell 50 via cooler 53. The main source of cooling for the fuel cell is by separate system 50A and the heat from this source may be used elsewhere in the process.

Figure 3:
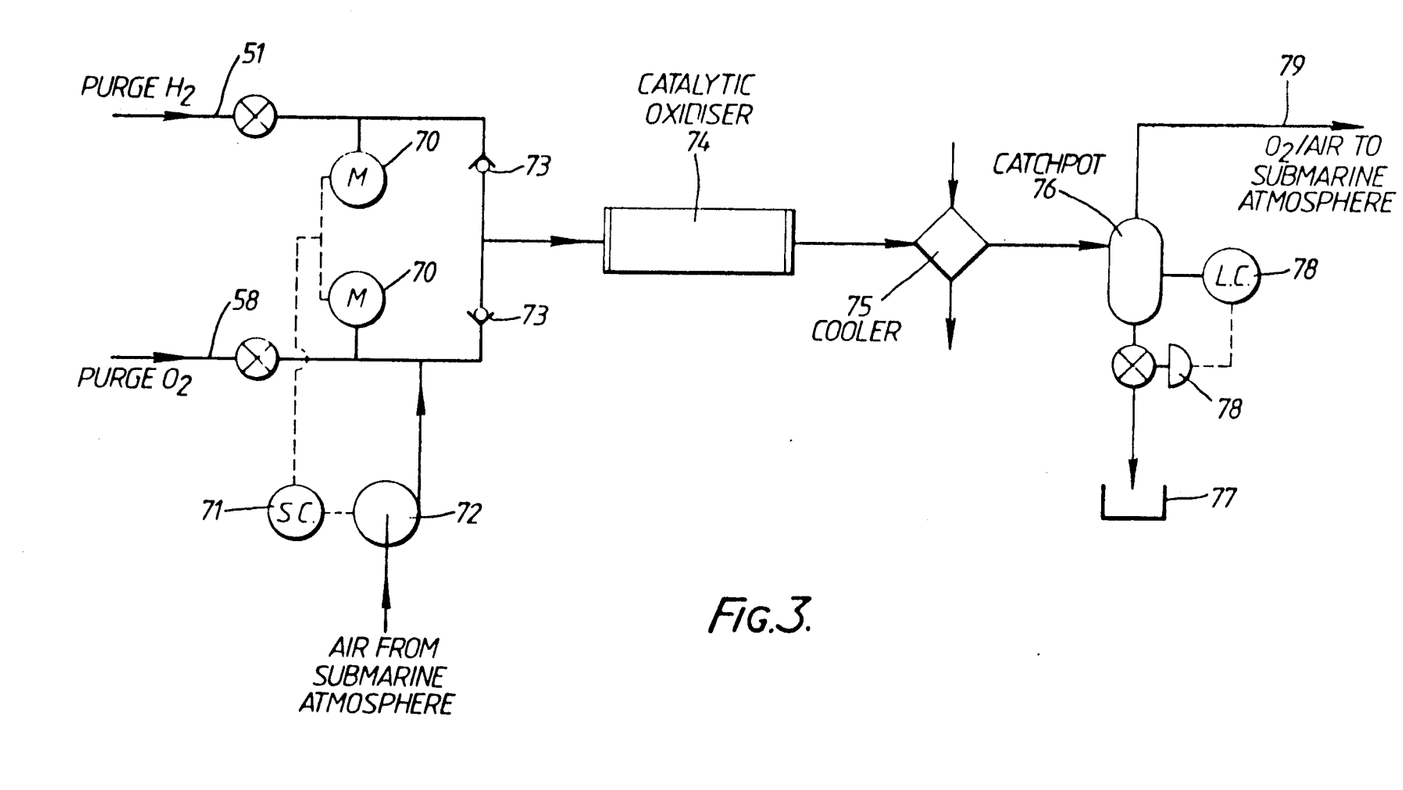
FIG. 3 is a diagrammatic illustration of catalytic oxidation of purges of oxygen and hydrogen gases.

As neither hydrogen or oxygen are appreciably soluble in sea water, the purge gases cannot be discharged overboard and must thus be disposed of in another way. In FIG. 3, two metering devices 70 monitor the flows in pipe lines 51 and 58 (FIGS. 2 and 3), and send signals to a stoichiometric controller (S.C.) 71 which activates pump 72 to pump in air from the submarine atmosphere whenever the hydrogen-oxygen ratio exceeds a preset value. The air from pump 72 also acts as a diluent and thus limits the temperatures reached in a catalytic oxidizer 74. The two gas flows then pass via non-return valves 73 to catalytic oxidizer 74, where reaction 5 occurs. After condensing the steam in a cooler 75, the resulting water is collected in a catchpot 76 and discharged via level controller/valve 78 to tankage 77; it would be potable, but would not be used for methanol dilution. The mixture of air/oxygen from catchpot 76 is discharged back to the atmosphere of the submarine via pipe 79.

The electrical generating plant just described offers a completely self-contained power generation system operable without requiring any external air/oxygen. The oxygen from the submarine atmosphere passed by pump 72 (FIG. 3) could equally well come from oxygen purge line 58 by opening the valve in this pipe a little more. The process either recycles or discharges its own waste products and thus does not contaminate the environment. Additionally, if the hydrogen peroxide decomposition reaction alone is run, or is run at a rate higher than stoichiometric requirements, oxygen may be added to the submarine atmosphere via pipe 79.

To start up the process, hydrogen peroxide is admitted to decomposer 12 together with some of the calcium permanganate promoter. This will heat up the decomposer 12 and the heat exchanger 16. Then methanol/water is passed through heat exchanger 16 and into reformer 21 where, because of the low temperature, the rate of methanol conversion is low. This results in a high proportion of methanol being oxidized in the catalytic oxidizer 41 and hence high heat transfer in the heat exchanger 29, leading to higher methanol/water input temperatures in the reformer 21. Thus the rate of conversion of methanol and the heat input to the methanol/water in heat exchangers 16 and 29 will result in a stable equilibrium being achieved after a period of operation and maintained thereafter.

Where changes in electrical power output are required, this could be achieved by changes in input flows of hydrogen peroxide and methanol/water via an automatic control system. If required, small oxygen and hydrogen reservoirs (not shown) may be provided in pipes 19 and 38 respectively. Any time lag between power demand and power output may be made up/absorbed by the submarine's batteries. The system is well suited to automatic control in an unmanned environment.

A further point, which is very important for operation in a confined environment, is that the system is almost completely silent. This is particularly useful in a submarine trying to avoid detection, but also important for the health and safety of personnel working in or near the same location as the system.

Though this specification has been written with reference to use of the electrical generating plant in submarines, its application extends to many other fields, e.g. submarine habitats for oil exploration, mining, fish farming, rescue equipment for use in mines, caves, emergency equipment for use where naked flames may be prohibited, e.g. oil rigs, petroleum refineries, space exploration and colonization.

It should be understood that FIGS. 1 to 3 are somewhat schematic flow diagrams, and that detailed aspects of the apparatus may be modified as further test work is performed.

Figure 5:
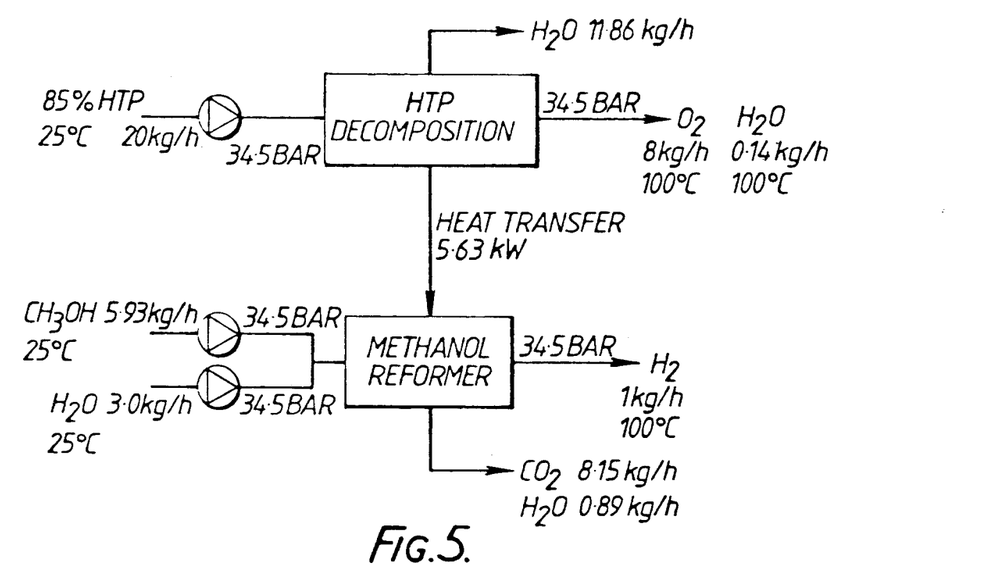
FIG. 5 is an overall heat and mass balance diagram for the simultaneous production of oxygen and hydrogen in the plant.

FIG. 5 is an overall heat and mass balance diagram and assumes process heat recovery via heat exchangers etc. (as shown generally in the other figures), for the simultaneous production of oxygen and hydrogen from the decomposition of hydrogen peroxide and the reforming of methanol respectively, in the plant as shown in FIGS. 1 to 3.

Currently, two basic types of fuel cell are possible:
(i) A first type which requires high purity gaseous hydrogen and high purity gaseous oxygen, and
(ii) A second type which requires a high purity gaseous hydrogen and a source of oxygen which may be either the pure gas or an impure gas such as air.

If fuel cells of the first type are used, the flow diagrams may be very similar to those shown in FIGS. 1, 2 and 3. If, however, fuel cells of the second type are used, a modification of the flow diagram of FIG. 1 will be required.

Referring now to FIG. 4, there is shown an embodiment of electrical generating plant according to the invention which is intended for use as an electrical source of energy for driving the drive train of a submarine. The plant of FIG. 4 has dual modes of operation, as will be evident from the subsequent detailed description, in which parts corresponding with those already described with reference to FIGS. 1 to 3 are designated by the same reference numerals, and will not therefore be described in detail again.

When the submarine is operating underwater, the electrical generating plant shown in FIG. 4 will operate generally similarly to the plant of FIGS. 1 to 3, in that liquid hydrogen peroxide is supplied to the decomposer 12 to provide (1) a supply of gaseous oxygen to the fuel cell and (2) a source of heat which may be used to promote the reforming reaction in the reformer 21, and methanol is supplied to the reformer so as to undergo the endothermic reaction which liberates gaseous hydrogen for supply to the fuel cell.

However, when the submarine is operating on the surface or snorting, the supply of hydrogen peroxide can be conserved by switching the operation of the plant so that aspirated air can be used as the source of gaseous oxygen for the fuel cell.

Therefore, an input of air (not shown) is provided to the pipe 19. However, when air is used as the sole source of oxygen, heat must be provided for the reforming reaction in the reformer from alternative heat sources. This can be achieved by providing a fuel burner to burn fuel, such as the methanol, or other fuels.

The combustion could take place in one of three places:

(i) In or close to decomposer 12.
(ii) In a separate combustor or in a catalytic oxidizer 46 with high heat transfer connections to reformer 21.
(iii) In catalytic oxidizer(s) 41.

In all cases, the methanol (or other suitable fuel, e.g. diesel oil) and air would be admitted to the appropriate vessel and catalytic combustion would occur. Only if a combustor was used in (ii) above would there actually be any flame. Methanol would be a preferred fuel for combustion in decomposer 12 as there would be no impurities (e.g. SO$_2$ if diesel fuel were used) to affect the fuel cell where poisoning of the electrodes can easily occur.

Three separate points are given above and shown on FIG. 4 where the methanol (or other suitable fuel) could be burnt. Each option will be considered in turn.

(i) Oxidation of Fuel in Hydrogen Peroxide Decomposer 12

The advantage of this option is that no or minimal additional plant is required and the hydrogen peroxide and methanol decomposition reactions could be alternated rapidly whenever the submarine dived or surfaced. Additional air would be added to ensure complete combustion and provide for the oxygen requirements of the fuel cell. Under these circumstances all the combustion products as well as the additional air would pass through the whole system, i.e. via pipe 19 and fuel cell 50 to be rejected via purge 58 and pipe 79. This would result in the risk of poisoning the fuel cell catalyst; there would also be a reduced partial pressure of oxygen in the fuel cell. It may thus be necessary to exhaust the products of the methanol combustion after heat exchanger 16 and introduce a separate air supply into oxygen pipe 19.

(ii) Combustion or Catalytic Oxidation in Separate Vessel 46

In this case a separate vessel preferably in intimate thermal contact with reformer 21 would be used. The extra volume of such a vessel would be a disadvantage in a submarine but it would keep combustion products away from the fuel cell. The hot combustion gases would be exhausted via catalytic oxidizer(s) 41, heat exchangers 29 and pipe 45. A separate supply of air would be admitted to oxygen pipe 19 for fuel cell 50.

(iii) Combustion in Catalytic Oxidizers 41

Here again the combustion products would be kept free from the fuel cell and additional air admitted to pipe 19. Though no additional plant is required, the heat of combustion is applied via heat exchangers 29 and not directly to reformer 21. Electrical heating in reformer 21 could be used as a supplement.

In practice, a combination of more than one of the three alternatives could be used, supplemented by electric heating if necessary. On a submarine, one of the most important factors would be the ability to change from the air system (mode II) to the hydrogen peroxide one (mode I) in a minimum of time.

When the second type of cells are used, fuel cells could become the main form of propulsion for all conditions, i.e. there would be no need for a main diesel engine. Fuel supplies would thus consist mostly of methanol, or another reformable hydrocarbon, plus a smaller quantity of hydrogen peroxide for use only when fully submerged.

Figure 6:
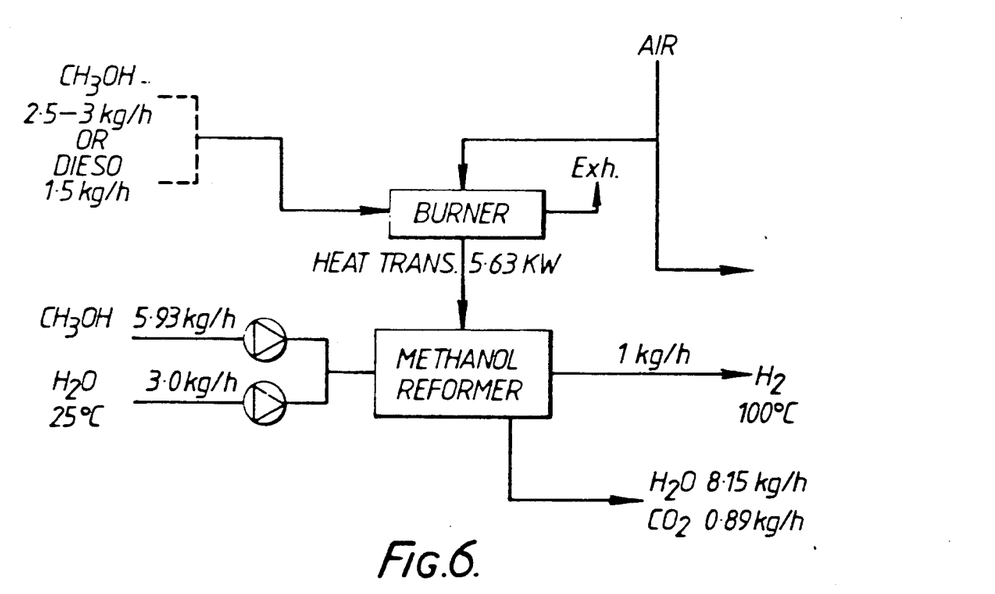
FIG. 6 is an overall heat and mass balance diagram, relevant to the plant of FIG. 4, for the production of hydrogen using an alternative heat source to maintain the reaction.

FIG. 6 is an overall heat and mass balance diagram for the production of hydrogen by reforming methanol using an alternative heat source and assumes process heat recovery via heat exchangers etc, as shown in the Figure, (to that as described above with reference to FIGS. 1 to 3), for maintaining the endothermic reaction in the reformer arrangement of FIG. 4. This alternative heat source is assumed to be derived from heat generated by a combustion process, as shown in FIG. 6.

We claim:

1. An electrical generating plant having dual modes of operation and comprising:

a fuel cell which requires a supply of gaseous hydrogen and a supply of gaseous oxygen in order to generate an electrical output;

first supply means for supplying to the plant a hydrogen-containing compound which is liquid at NTP and which can undergo an endothermic reaction to liberate gaseous hydrogen;

second supply means selectively operable for supplying to the plant liquid hydrogen peroxide in a first mode of operation and air in a second mode of operation;

a reformer, connected to the first supply means, in which said hydrogen-containing compound can undergo said endothermic reaction and liberate gaseous hydrogen;

a decomposer which is selectively connectable to said second supply means, in the first mode of operation, and which is arranged to decompose the hydrogen peroxide exothermically so as to liberate gaseous oxygen;

means for transmitting to the hydrogen-containing compound at least some of the heat which is given-off in the decomposer in the first mode of operation, so as to maintain the endothermic reaction in the reformer;

means for supplying heat to the hydrogen-containing compound, in the second mode of operation, so as to maintain the endothermic reaction in the reformer;

means for supplying the gaseous hydrogen given-off in the reformer to the fuel cell; and means for supplying to the fuel cell the gaseous oxygen which is given-off in the decomposer in the first mode of operation, and means for supplying the air to the fuel cell in the second mode of operation, whereby an electrical output is obtainable from the fuel cell in the first or the second modes of operation.

2. An electrical generating plant according to claim 1, in which said heat supplying means is arranged to supply a substantial portion of the heat required to the hydrogen-containing compound before the compound is received by the reformer.

3. An electrical generating plant according to claim 2, including a heat exchanger arranged upstream of the reformer so as to impart up to 80% of the heat required to the compound before the compound is received by the reformer.

4. An electrical generating plant according to claim 1, in which the decomposer and the reformer are coupled together for direct thermal transmission therebetween, so as to provide at least part of the heat required to maintain the endothermic reaction in the reformer.

5. An electrical generating plant according to claim 1, including fuel burning means which is operable, in the second mode of operation, to supply heat to the reformer so as to maintain the endothermic reaction in the reformer.

6. An electrical generating plant according to claim 5, in which the fuel burner is arranged to burn the hydrogen-containing compound.

7. An electrical generating plant according to claim 5, in which the decomposer is arranged to burn fuel therein to provide heat for supply to the reformer, to maintain the endothermic reaction in the reformer, in the second mode of operation.

8. An electrical generating plant according to claim 5, including a separate catalytic oxidizer for consuming the fuel and arranged to pre-heat the hydrogen-containing compound before the latter passes to the reformer.

9. An electrical generating plant according to claim 5, including an electrical resistance heater in the reformer for maintaining the endothermic reaction in the first or second modes of operation.

10. An electrical generating plant according to claim 1, including supply means for supplying methanol to the plant as said hydrogen-containing compound.

11. An electrical generating plant according to claim 1, including a hydrogen diffusion separator connected between the reformer and the fuel cell, for separating hydrogen from other products issuing from the reformer.

12. An electrical generating plant according to claim 11, including a palladium filter arranged in said hydrogen diffusion separator.

13. A submarine electrical generating plant for the electrical driving of the submarine drive train and having dual modes of operation, said plant comprising:

a plurality of fuel cells which requires a supply of gaseous hydrogen and a supply of gaseous oxygen in order to generate an electrical output;

first supply means for supplying methanol to the plant;

second supply means selectively operable for supplying, to the plant, liquid hydrogen peroxide in a first mode of operation and air in a second mode of operation;

a reformer, connected to the first supply means, in which the methanol can undergo an endothermic reforming reaction so as to liberate gaseous hydrogen;

a decomposer which is selectively connectable to said second supply means, in the first mode of operation, and which is arranged to decompose the hydrogen peroxide exothermically so as to liberate gaseous oxygen;

means for transmitting to the methanol prior to and/or during its reception by the reformer, the heat which is given-off in the decomposer in the first mode of operation, so as to maintain the endothermic reaction in the reformer;

means for supplying heat to the methanol in the second mode of operation, prior to and/or during its reception by the reformer, so as to maintain the endothermic reaction in the reformer;

means for supplying the gaseous hydrogen given-off in the reformer to the fuel cells; and means for supplying to the fuel cell the gaseous oxygen which is given-off in the decomposer in the first mode of operation, and means for supplying the air to the fuel cells in the second mode of operation, whereby an electrical output is obtainable from the fuel cells in the first or the second modes of operation.

14. A submarine electrical generating plant according to claim 13, including supply tanks for methanol and liquid hydrogen peroxide, located in the interspace between the pressure hull and the hydrodynamic hull of a submarine.

15. A submarine electrical generating plant according to claim 14, in which the supply tanks are collapsible tanks.

16. A submarine electrical generating plant according to claim 13, including electrical storage batteries connected so as to receive at least part of the output from the fuel cells, or to supply additional power when required.

17. A submarine electrical generating plant according to claim 13, including control means for varying the rate of gas inputs to the fuel cells in order to control the electrical output of the plant.

* * * * *